Feb. 2, 1960 V. L. HESSE 2,923,929

SYNCHRONOUS FREQUENCY-TO-DIFUNCTION CONVERSION

Filed May 29, 1956 4 Sheets-Sheet 1

INVENTOR.
VICTOR L. HESSE
BY
Seymour M. Rosenberg
ATTORNEY

Feb. 2, 1960 V. L. HESSE 2,923,929

SYNCHRONOUS FREQUENCY-TO-DIFUNCTION CONVERSION

Filed May 29, 1956 4 Sheets-Sheet 2

INVENTOR.
VICTOR L. HESSE

BY

Seymour M. Rosenberg

ATTORNEY

INVENTOR.
VICTOR L. HESSE
BY
Seymour M. Rosenberg
ATTORNEY

Feb. 2, 1960 V. L. HESSE 2,923,929

SYNCHRONOUS FREQUENCY-TO-DIFUNCTION CONVERSION

Filed May 29, 1956 4 Sheets-Sheet 4

INVENTOR.
VICTOR L. HESSE
BY
Seymour M. Rosenberg
ATTORNEY 2,923,929

SYNCHRONOUS FREQUENCY-TO-DIFUNCTION CONVERSION

Victor L. Hesse, Los Angeles, Calif., assignor to Litton Industries of California, Beverly Hills, Calif.

Application May 29, 1956, Serial No. 588,025

14 Claims. (Cl. 340—347)

The present invention relates to a fully synchronous input conversion device for digital computers which functions to non-ambiguously transform an unsynchronized variable frequency input signal into a difunction signal train representative of the frequency of the input signal.

In recent developments in the field of electronic digital computation, computers have been developed in which information as to quantity magnitudes is conveyed, not by voltage magnitudes or by the digits of numbers (as is usually done in the prior art), but is instead non-numerically conveyed by a so-called difunction signal train. Basically in a difunction signal train, each successive signal in the signal train represents either a predetermined number $N_1$ or a predetermined number $N_2$ and the value of the signal train is defined as the average value of the numbers represented by the signal train.

In the numerical code signal trains customarily used in the prior art, each signal represents a digit of a number, its weight being determined by the position of the signal in a time series. In contrast thereto, in a defunction signal train each like valued signal in the train has the same weight or significance wherever it may appear. Further the value of the signal train is determined by the average of the signals contained in the train rather than by the weighted sum of signals arranged to represent the digits of a number.

As an illustration of the nature of a difunction signal train, consider a train synchronized with respect to an applied timing signal of period T, one bivalued signal being produced during each period and representing either the number +1 ($N_1=+1$), or the number −1 ($N_2=-1$). If the number of +1 representing signals is designated as $n_1$ and the number of −1 representing signals is designated as $n_2$ then the value of the signal train is given by the average of the numbers represented by these signals and is therefore equal to $$\frac{n_1(+1)+n_2(-1)}{n_1+n_2}$$

Such a difunction signal train can accurately represent all quantities lying between +1 and −1. If for example, the train comprises an unbroken string of +1 valued signals and contains no −1 valued signals, then the signal train has a value of +1 (since the average value of the signals in the train is equal to +1). Similarly the signal train has a value of −1 when it comprises an unbroken string of −1 valued signals. A value of zero is represented by the signal train when it comprises alternate +1 and −1 valued signals and in the same manner it can represent intermediate positive or negative values by containing an excess of +1 or −1 valued signals.

It has been found that with very simple equipment virtually all computational and control operations can be directly performed with difunction signal trains. For example apparatus for adding and subtracting difunction signal trains and for controlling motors with the resultant difunction trains is described in copending U.S. patent application, Serial No. 311,609, for "Computer and Indicator System," by Floyd G. Steele, filed September 1952. Other apparatus for multiplying and dividing difuncton signal trains by each other is described in copending U.S. patent application, Serial No. 510,673, for "Difunction Computing Elements," by Floyd G. Steele, filed May 1955.

The equipment utilized for the performance of these mathematical and control operations with difunction signal trains is characterized by extraordinary simplicity and requires relatively few components for the mechanization thereof. It appears that a twofold advantage accrues from the use of the di-function signal trains for the representation of quantity magnitudes: first, that the formation and transmission of input data to and from a computer may be greatly simplified; and secondly, that the equipment required for the performance of internal computations and manipulations is reduced in complexity.

Because of the above described advantages arising from the use of difunction signal trains for the representation of quantity magnitudes, a definite need has been created for input conversion devices which can transform applied analog input signals and other quantities into corresponding difunction signal trains. In a copending U.S. patent application Serial No. 588,078, for "Input Conversion Methods and Apparatus," by Floyd G. Steele, filed May 29, 1956, there is disclosed one type of converter in which a two step process is followed in which first a periodic signal is produced whose frequency is proportional to a predetermined function of the magnitude of the input signal, and secondly, this periodic signal is transformed by a so-called "frequency-to-difunction converter" into a difunction signal train whose value is directly proportional to the frequency of the periodic signal.

As explained in said copending application, in the operation of the frequency-to-difunction converter, there described, variable frequency input signals having a frequency $f_1$ greater than $nf_2$ and les than $[n+1]f_2$ (where $f_2$ is the frequency of an applied timing signal and $n$ is an integer) are applied to the converter during each period T of the timing signal. A difunction signal is produced having a first value ($N_1$) of an odd number of counts are registered during the period and having a second value ($N_2$) if an even number of counts are received during the period. The successive difunction signals thus produced comprise the required difunction signal train, the average value of the signals being directly proportional to the frequency of the input signal.

As illustrated in said copending application, a single flip-flop asynchronously counting the input signals was sufficient to determine whether an odd or even number of input signals has been received. The flip-flop is placed in a predetermined state at the beginning of each period T by the applied timing signal and thereafter reverses state upon each occurrence of an input signal. Thus the final state of the flip-flop at the end of the period indicates whether an odd or even number of signals has been received and at that time in response to the next timing signal a corresponding difunction signal is produced and the flip-flop is reset to its predetermined state so as to count anew in the next period.

As explained in said copending application, one limitation of this type of circuit is that there may occasionally occur an ambiguity of operation which causes counts to be missed by the counting flip-flop. Such a situation arises if an input signal arrives very shortly before a timing signal, for then the counting flip-flop does not have an opportunity to change state in response to the input signal before it is interrogated and reset by the timing signal and therefore that input signal may not be counted at all. Methods are described in said copending application for minimizing the number of false or ambiguous counts. Moreover several embodiments were shown in which count ambiguity is entirely eliminated by utilizing two flip-flops as a buffer unit which receives the asynchronous input signals and synchronizes them before applying them to the counting flip-flops.

It will be noted that the various mechanizations disclosed in said copending application included at least one asynchronously operating flip-flop. Since a flip-flop which operates in such manner has to be continuously available so as to receive input signals whenever they occur, it is clear that if a number of input frequencies had to be converted, there had to be at least one such asynchronously operating flip-flop associated with each input, with a larger number of flip-flops being required if perfectly non-ambiguous operation were to be obtained. Thus the frequency-to-difunction converter there described had to be at least partly duplicated for each input. For a large number of inputs it would be desirable to develop a circuit in which all elements thereof operated only synchronously in response to a timing signal so that a single converter could be time shared by a number of inputs, each input being applied in turn to the converter and the corresponding difunction signal being produced in response thereto. It would also be desirable that completely non-ambiguous operation be obtained with fewer components.

Actually these two desirable characteristics are related, for it has been shown that one case of ambiguous operation results from a necessity for synchronously interrogating and resetting a normally asynchronously operating flip-flop. If only synchronously operating devices were utilized, ambiguity of operation could possibly be eliminated and also the resultant converter would be capable of being time shared among a number of inputs.

In accordance with the present invention a frequency-to-difunction converter is provided which displays the desirable characteristics described above. In the converter of the present invention all elements thereof operate synchronously in response to an applied timing signal. The converter of the present invention is non-ambiguous in operation and is moreover readily adapted for time shared operation with a number of input frequencies. In the present specification, for example, an embodiment of the invention is described in which a single converter is shared by six variable frequency input signals, the converter functioning to cyclically sample each of the variable frequency input signals and produce a corresponding difunction signal, the successive difunction signals formed comprising six difunction signal trains whose average values are respectively proportional to the six variable input frequencies.

The frequency-to-difunction converter of the present invention is adapted for accepting unsynchronized variable frequency input signals composed of alternate high and low voltage amplitudes (as for example a sine wave or a square wave signal) and is responsive to such input signals and to fixed frequency timing signals K1 having a predetermined period T to produce an output train of difunction output signals synchronized with respect to timing signals K1 and representative of the frequency of alternation of the input signal. According to the basic concept of the frequency-to-difunction converter of the invention, in operation the voltage level of the input signal is sampled in response to each timing signal K1 and a resultant bivalued signal $B_i$ (where $i$ has the successive values of 1, 2, 3, . . . etc.) is generated which is synchronized with respect to the timing signal K1 and whose value represents the sampled voltage amplitude of the input signal. For example in several embodiments of the invention a resultant signal $B_i$ is generated which has a high level if the input signal is high at the instant of sampling and having a low voltage level if the input signal is low at the instant of sampling.

Each of the synchronous resultant signals thus produced is delayed for one period T in a delay element, so that when the next signal $B_i$ is generated, the preceding signal designated $B_{i-1}$ is issuing from the delay element. In this manner each signal $B_i$ and the delayed preceding signal $B_{i-1}$ are simultaneously presented. It can be shown that each pair of simultaneously presented signals $B_i$ and $B_{i-1}$ represent a corresponding difunction value, for if $B_i$ and $B_{i-1}$ are different there must have been an odd number of alternations of the input signal within the period T between two samplings (signifying a difunction value of $N_1$) while if $B_i$ and $B_{i-1}$ are the same there must have been an even number of alternations of the input signal within the corresponding period T (signifying a difunction value of $N_2$).

Each pair of simultaneously presented signals $B_i$ and $B_{i-1}$ is applied to a signal combining circuit which functions to produce a difunction signal train representative of the frequency of the input signal. In its simplest form the combining circuit combines each signal $B_i$ with the simultaneously presented signal $B_{i-1}$ to produce a difunction signal $S_i$ which has the difunction value $N_1$ if $B_i$ and $B_{i-1}$ are different and the value $N_2$ if they are the same. The successive signals $S_i$ thus formed comprise a difunction signal train whose average value is directly proportional to the frequency of the input signal this difunction signal train being utilizable for the performance of mathematical operations with and upon other difunction trains. In other embodiments, since the pair of signals $B_i$ and $B_{i-1}$ together represent a difunction value, they are directly combined with signals of an additional quantity representing signal train to produce a resultant difunction signal train representative of a mathematical function of the input frequency and the quantity represented by the additional signal train.

Those skilled in the art will question as to what will occur when the input signal is sampled at a time when it is in the process of alternating so that its voltage level is ambiguous, neither definitely low nor definitely high. It is shown that it may be made quite immaterial whether the signal $B_i$ which is produced in response to such an ambiguous input is high or low, for the ambiguity apparently introduced is effectively cancelled out by the fact that in operation the signal produced is used once with the preceding signal and once with the succeeding signal to determine two successive difunction values. It is demonstrated that with suitable restrictions of the range of the input frequency, perfectly non-ambiguous operation is thereby obtained.

It is therefore an object of the present invention to provide a frequency-to-difunction converter in which all elements thereof operate synchronously with respect to an applied timing signal.

It is another object of the present invention to provide a fully synchronous frequency-to-difunction converter which is free of any ambiguity of operation.

It is still another object of the present invention to provide a fully synchronous non-ambiguous frequency-to-difunction converter which is free of any ambiguity of operation.

It is still another object of the present invention to provide a fully synchronous non-ambiguous frequency-to-difunction converter which in time-shared operation receives a plurality of variable frequency input signals and converts these input frequencies to corresponding difunction form.

It is yet another object of the invention to provide a frequency-to-difunction converter wherein a variable frequency input signal is synchronously sampled to produce a train of bivalued signals $B_i$ in which each signal and the preceding signal together represent a difunction value.

It is still another object of the invention to provide a frequency-to-difunction converter wherein a variable frequency input signal is synchronously sampled to produce a train of bivalued signals $B_i$, each signal being delayed so that the preceding signal $B_{i-1}$ and the present signal $B_i$ are simultaneously presented, each pair of signals $B_i$ and $B_{i-1}$ representing a corresponding difunction value.

It is a further object of the present invention to provide a frequency-to-difunction converter wherein a variable frequency input signal is synchronously sampled to produce a series of corresponding bivalued signals $B_i$, each signal $B_i$ and the preceding signal $B_{i-1}$ being simultaneously applied to a signal combining circuit to form a corresponding difunction signal, the successive difunction signals forming a difunction signal train representative of the frequency of the input signal.

The novel features which are believed to be characteristic of the invention, both as to its organization and method of operation, together with further objects and advantages thereof, will be better understood from the following description considered in connection with the accompanying drawings in which several embodiments of the invention are illustrated by way of example. It is to be expressly understood, however, that the drawings are for the purpose of illustration and description only, and are not intended as a definition of the limits of the invention.

Figure 2:
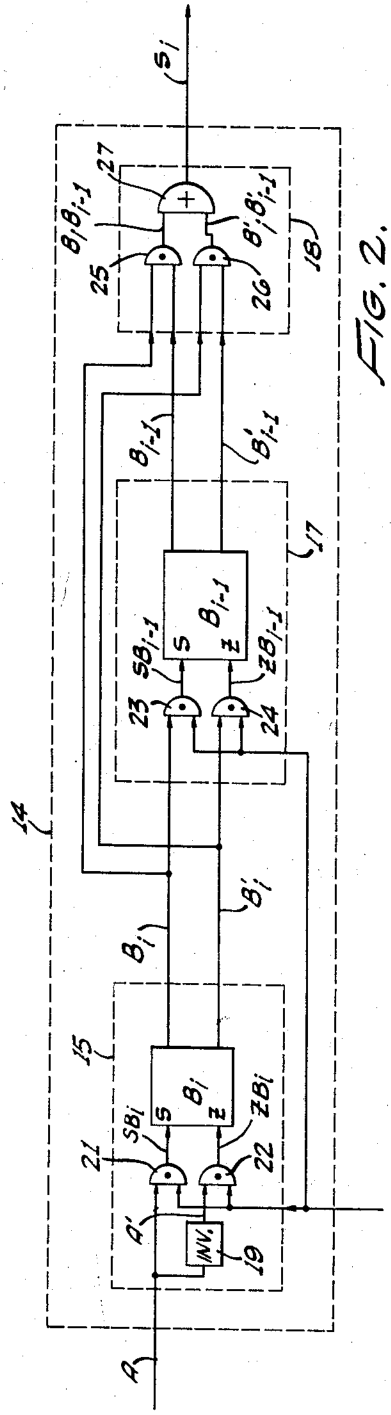
Fig. 2 is a detailed circuit diagram of one embodiment of the frequency-to-difunction converter of the present invention.
Figure 5:
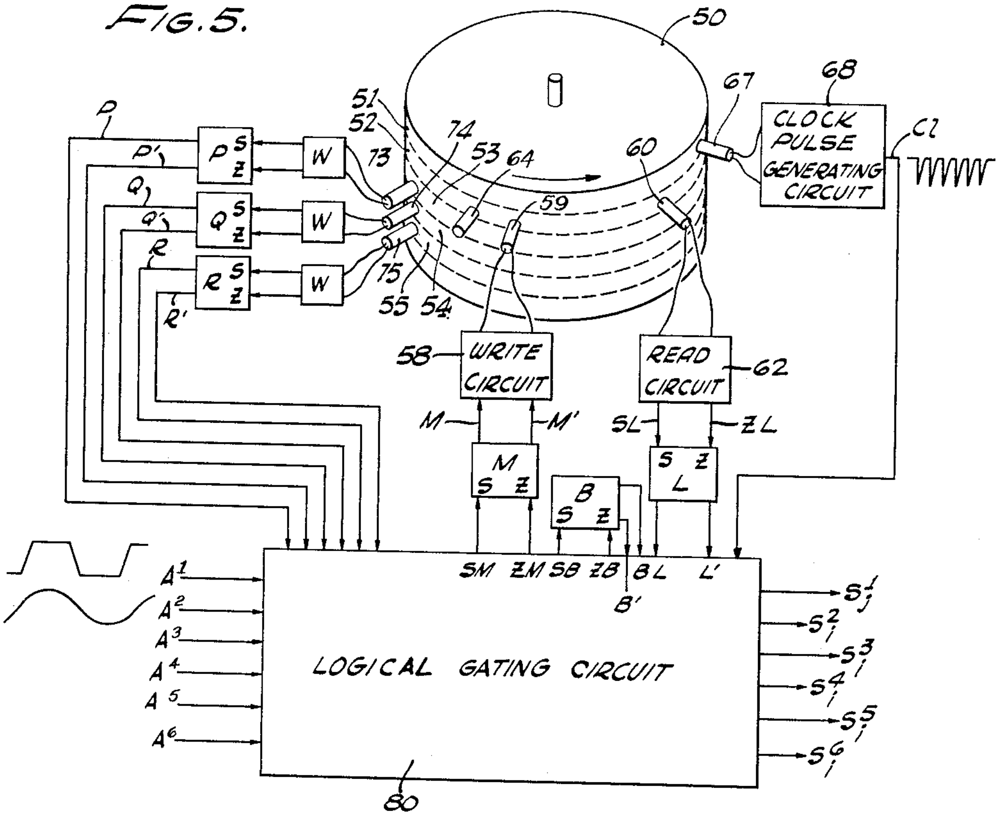
Figure 7:
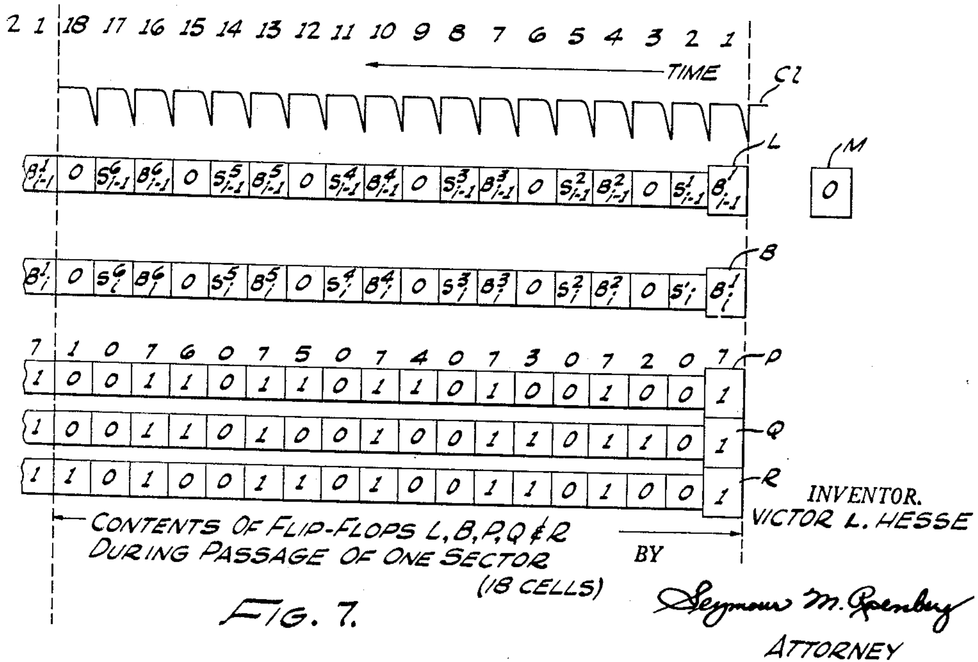
Figure 6A:
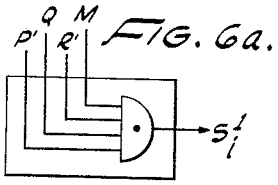
Figure 6B:
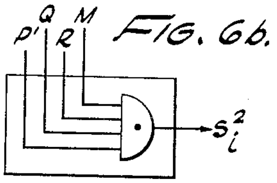
Figure 6C:
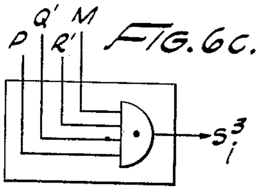
Figure 6D:
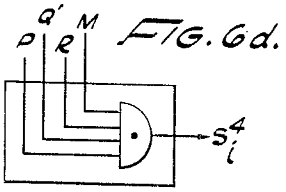
Figure 6E:
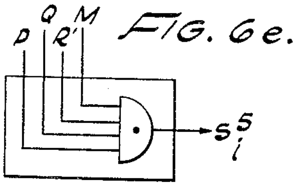
Figure 6F:
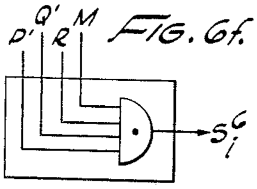
Figure 6G:
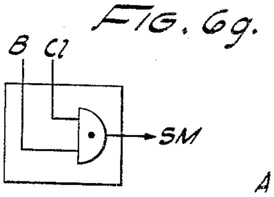
Figure 6H:
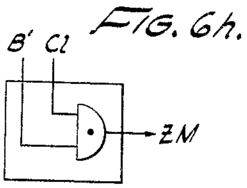
Figure 6I:
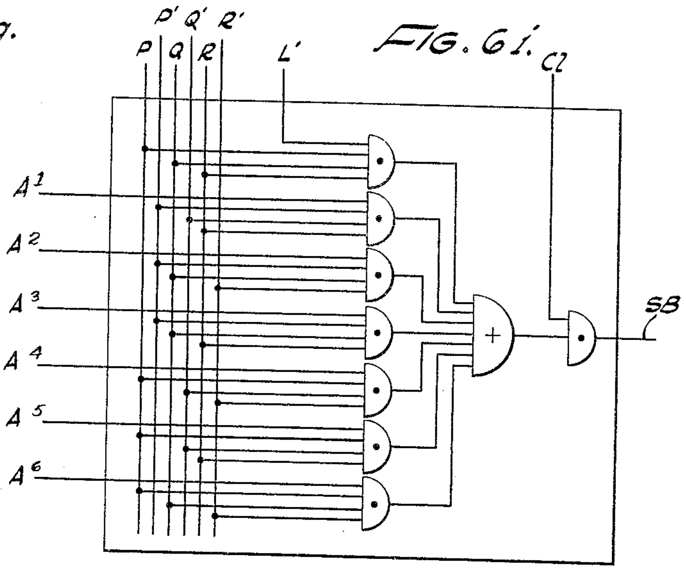
Figure 6J:
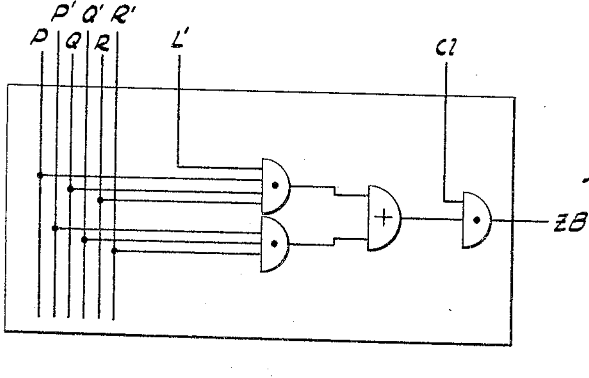
Figures 3A, 3B, 3C:
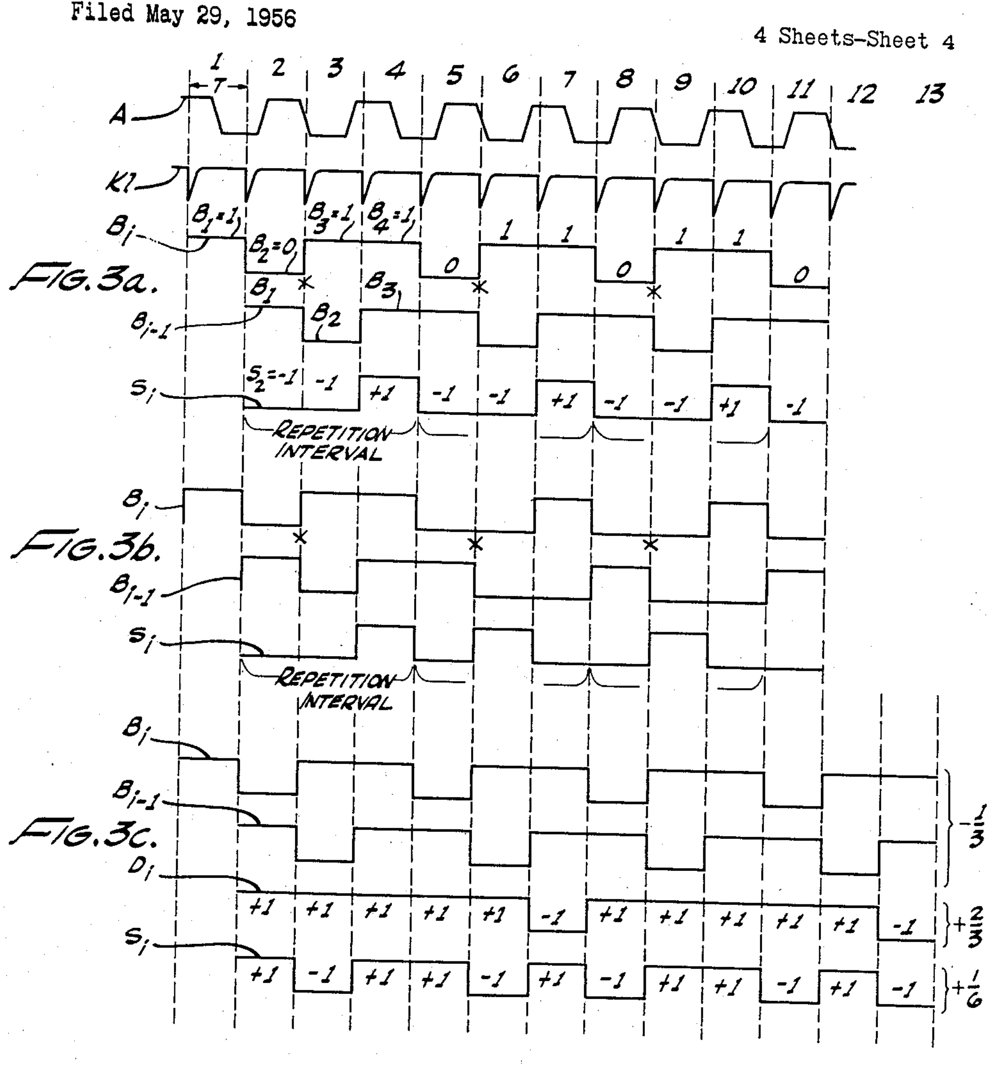
Figure 4:
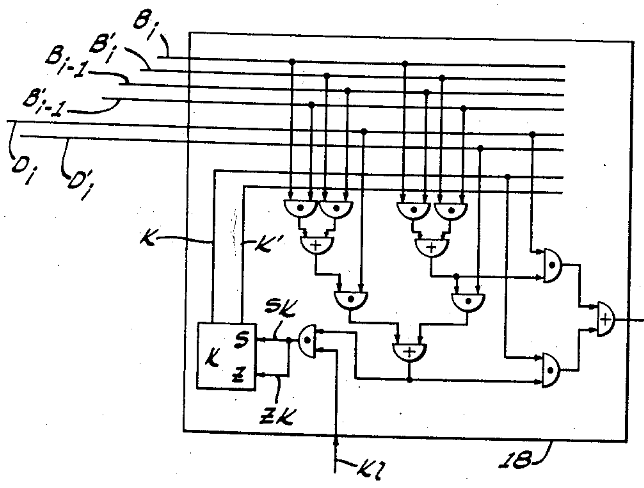

Figs. 3*a*, 3*b* and 3*c* are waveform charts wherein are displayed on a common time scale the waveforms of various signals as they would appear during the operation of the frequency-to-difunction converter shown in Fig. 2;

Fig. 4 is a circuit diagram of a modified form of signal combining circuit which may be utilized in the converter of the present invention;

Fig. 5 is a partly block, partly circuit diagram of a modified form of frequency-to-difunction converter which is adapted for operating upon a plurality of variable frequency input signals to produce corresponding difunction signal trains;

Figs. 6*a* through 6*j* are detailed circuit diagrams of a plurality of logical gating networks which together comprise a logical gating circuit shown in Fig. 5;

Fig. 7 is a timing chart wherein are illustrated on a common time scale successive contents of various flip-flops utilized in the embodiment of the frequency-to-difunction converter shown in Fig. 5.

Figure 1:
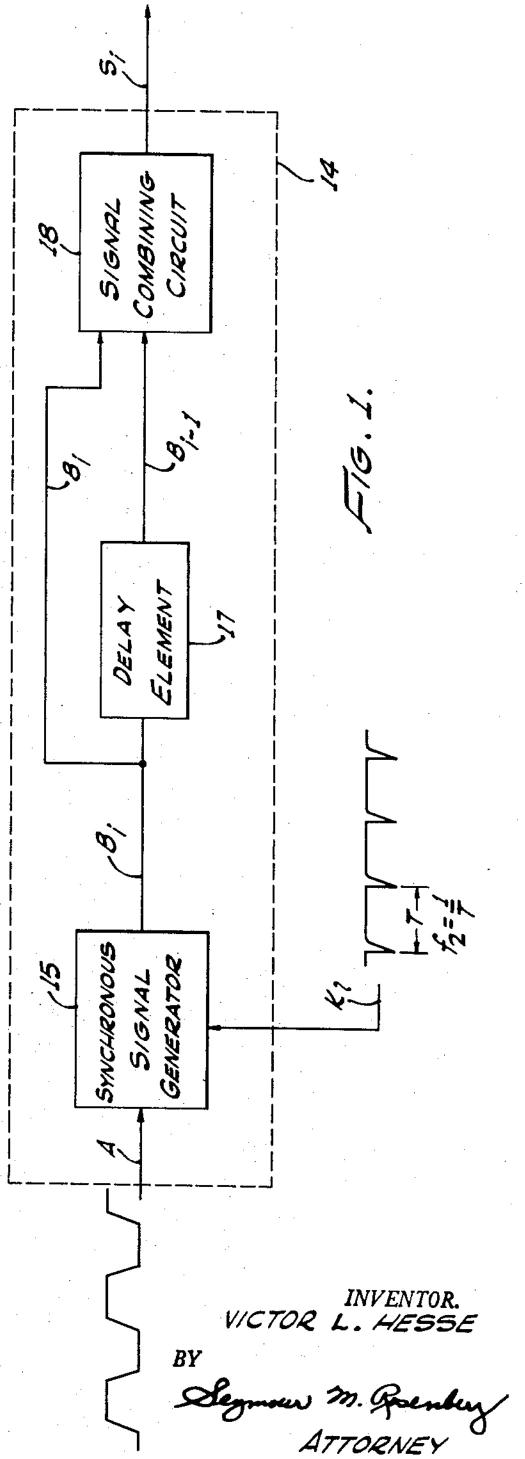
Fig. 1 is a generic block diagram of a frequency-to-difunction converter according to the present invention.

Referring now to the drawings, there is shown in Fig. 1 a generic block diagram of a frequency-to-difunction input converter 14 according to the present invention which is responsive to an unsynchronized variable frequency input signal A, composed of alternate high and low voltage amplitudes, and fixed frequency timing signals K1, having a predetermined period T, to produce an output train of bivalued difunction output signals $S_i$ synchronized with respect to timing signals K1 and non-numerically representative of the frequency of alternation, designated $f_1$, of signal A. During each period T of the timing signals, input converter 14 produces one bivalued output signal $S_i$ having either a first value representing a predetermined number $N_1$ or a second value representing a predetermined number $N_2$, the value of the output train being equal to the average of the numbers represented by the signals $S_i$ thereof. It is this type of representation, in which all like valued signals of a signal train have equal weights and in which the value of the signal train is determined by the average of the signals in the signal train, which is herein designated as a difunction type of non-numerical representation.

As shown in Fig. 1, converter 14 comprises a synchronous signal generator 15, a delay element 17, and a signal combining circuit 18. In accordance with the invention, synchronous signal generator 15 receives both input signal A and timing signal K1 and produces a train of signals $B_i$. More particularly, signal generator 15 is responsive to timing signal K1 for sampling the instantaneous voltage level of signal A and generating a resultant bivalued output signal $B_i$ which is synchronized with respect to the timing signal and whose value represents the sampled voltage amplitude of signal A.

For example, in several embodiments of the invention to be described hereinbelow, signal generator 15 produces a signal having a high voltage level if signal A is high at the instant of sampling and having a low voltage level if signal A is low at the instant of sampling. Further if signal A is at a transitional amplitude which is neither certainly high nor certainly low then generator 15 will respond to such an ambiguous input by producing either a definitely high or definitely low output signal. It will be shown at a later point in the present specification that it is quite immaterial whether a high or low output signal is produced by generator 15 in response to an ambiguous input for the reason that the remaining circuit elements of converter 14 operate to resolve and remove any errors which might thereby be created.

Recapitulating, it is clear that synchronous signal generator 15 produces one bivalued output signal $B_i$ during each period T of the timing signals K1, each bivalued signal representing the quantized high or low amplitude of signal A at the time of sampling (response to an ambiguous input being as explained hereinabove). As indicated in Fig. 1 the train of signals $B_i$ are applied to delay element 17 and to one input terminal of signal combining circuit 18.

Delay element 17 is operable for delaying each signal $B_i$ for a time T (it being remembered that T is the period of the timing signals K1), the delayed signals designated $B_{i-1}$ being applied to a second input terminal of signal combining circuit 18. In this manner, each time a signal $B_i$ from signal generator 15 is applied to signal combining circuit 18, the preceeding signal $B_{i-1}$ from generator 15 is simultaneously applied from delay element 17 to circuit 18. Signal combining circuit 18 is operative for combining each pair of signals applied thereto in accordance with their values to produce a resultant bivalued difunction output signal $S_i$.

To aid understanding it should be explained at this point that in the signal train produced by signal generator 15, a difunction value ($N_1$ or $N_2$) is represented by each signal $B_i$ and the preceding signal $B_{i-1}$. For example, suppose that the frequency $f_1$ of alternations of signal A is restricted to lie in a frequency range wherein $f_1$ is somewhat greater than $f_2$ and somewhat less than $2f_2$ (where $$f_2=\frac{1}{T}$$

and is the frequency of the timing signals K1) so that either one or two alternations of signal A can occur in a period T of timing signals K1.

As explained in copending application Serial No. 588,078 according to the principle of frequency-to-difunction conversion, each time two alternations of signal A occur within a period T, a difunction value of $N_1$ should be produced while each time a single alternation occurs within a period T a difunction value of $N_2$ should be produced. However, if there are two alternations within a period, the quantized high or low amplitude of signal A will be the same at the end of one period as it was at the end of the preceding period, and therefore the corresponding two successive signals from signal generator 15 will have the same value. On the other hand if there is only one alternation of signal A within a period T, the quantized high or low amplitude of signal A at the end of a period will be different from the amplitude at the end of the preceding period and therefore the corresponding two successive signals from signal generator 15 will have different values.

It is, therefore, clear that in the train of signals $B_i$, a difunction value ($N_1$ or $N_2$) represented by each signal and the preceding signal, the number $N_1$ being represented by a signal and the preceding signal having the same value and the number $N_2$ being represented by a signal and the preceding signal having different values. Stating this another way, successive signals $B_i$, where $i$ successively has the values 1, 2, 3, 4, etc., have a difunction value of $N_1$ when signal $B_i$ and the preceding signal $B_{i-1}$ have the same value, and have a difunction value of $N_2$ when signal $B_i$ and the preceding signal $B_{i-1}$ have different values. The action of delay element 17 then is to delay each signal for a period T so that each signal $B_{i-1}$ issuing from element 17 is simultaneously applied with the immediately following signal $B_i$ to signal combining circuit 18.

In its simplest form signal combining circuit 18 functions to combine each input signal $B_i$ with the simultaneously applied input signal $B_{i-1}$ to produce a bivalued difunction output signal $S_i$ whose value corresponds to the difunction value represented by the pair of input signals. Signal $S_i$ therefore represents the difunction value $N_1$ if signals $B_i$ and $B_{i-1}$ have the same values and the difunction value $N_2$ if signals $B_i$ and $B_{i-1}$ have different values. In this manner the train of signals $B_i$, in which a difunction value is represented by each pair of successive signals, is transformed into a conventional train of difunction signals $S_i$ in which each signal $S_i$ alone represents the corresponding difunction value.

The train difunction signals $S_i$ may then be utilized in a conventional manner for the performance of mathematical operations as by adding it or subtracting it to or from other difunction signal trains or multiplying it by other difunction signal trains etc. However it should be recognized that since signals $B_i$ and $B_{i-1}$ together represent a difunction value, it is not necessary that they first be combined before performing additional mathematical operation. Instead $B_i$ and $B_{i-1}$ signals may be directly combined with other input signals for the performance of the required mathematical operations. As an example, an embodiment of signal combining circuit 18 will be described at a later point in the present specification, wherein the signals $B_i$ and $B_{i-1}$ representing one quantity are combined with a difunction signal train D representing another quantity to produce a difunction output signal train representing the sum of the two quantities.

Referring now to Fig. 2 there is shown a circuit of a preferred embodiment of frequency-to-difunction converter 14 wherein: synchronous signal generator 15 includes an inverting amplifier 19, two two-terminal logical "and" gates 21 and 22, respectively, and a bistable flip-flop circuit designated flip-flop $B_i$ (the reason for this nomenclature will appear later); delay element 17 includes two two-terminal logical "and" gates 23 and 24 and another bistable flip-flop circuit designated $B_{i-1}$; and wherein signal combining circuit 18 includes two two-terminal logical "and" gates 25 and 26 and a two-terminal logical "or" gate 27.

As shown in Fig. 2 the variable frequency input signal A is applied to one input terminal of "and" gate 21 and applied to inverting amplifier 19 which functions to invert signal A so as to produce a complementary signal A' (a signal which is low when A is high and high when A is low), the complementary signal A' being applied to one input terminal of "and" gate 22. Timing signal K1, as indicated, is applied to the second input terminals of "and" gates 21 and 22 respectively.

In accordance with the ordinary operation of "and" gates, if signal A is high when timing signal K1 is applied, then "and" gate 21 will produce an output signal (SB) which as shown in Fig. 2 is applied to the set (S) input terminal of flip-flop $B_i$ to place the flip-flop in its "1" state. On the other hand if signal A is low (signal A' then being high) an output signal (ZB) will be produced by "and" gate 22 and, as shown, will be applied to the zero (Z) input terminal of flip-flop $B_i$ to place the flip-flop in its "0" state. As shown in Fig. 2, flip-flop $B_i$ produces two complementary bivalued output signals which in accordance with commonly used nomenclature are designated as signals $B_i$ and $B_i'$, the signal $B_i$ having a high "1" representing voltage level when flip-flop $B_i$ is in its "1" state and having a low "0" representing voltage level when flip-flop $B_i$ is in its "0" state, while complementary signal $B_i'$ always has a voltage level inverse or complementary to the level of signal $B_i$.

It is clear from the above description, that in operation the successive signals $B_i$ will be synchronized with timing signal K1, each signal having a "1" value during a period T if A was high at the time that timing signal K1 was applied and having a "0" value during a period if A was low at the time that K1 was applied. In this way, signals $B_i$ may be considered to be a train of successive "1" or "0" valued signals in accordance with the sampled high or low voltage amplitude respectively of signal A.

As indicated in Fig. 2, the train of signals $B_i$ (and also the train of complementary signals $B_i'$) is applied both as an input to signal combining circuit 18 and as an input to delay element 17. In the embodiment of delay element 17 shown in Fig. 2, the required delay of signals $B_i$ for a period T is obtained by utilizing flip-flop $B_{i-1}$ as a one period storage element. At the beginning of every period T in response to the timing signal K1 flip-flop $B_{i-1}$ is placed in that state (the "1" or "0" state) which flip-flop $B_i$ had during the preceding period. In this manner the successive levels during each period of the output signals $B_{i-1}$ and $B_{i-1}'$ produced by flip-flop $B_{i-1}$ always corresponds to the levels of signals $B_i$ and $B_i'$ during the previous period.

To accomplish the described setting in each period of flip-flop $B_{i-1}$ to the state which flip-flop $B_i$ had during the preceding period, signals $B_i$ and $B_i'$ are applied to input terminal of "and" gates 23 and 24 respectively, the timing signal K1 being applied to the second input terminals of these "and" gates. The outputs of gates 23 and 24 are applied to the inputs of flip-flop $B_{i-1}$ of the $SB_{i-1}$ and $ZB_{i-1}$ input signals respectively. Thus in response to a timing signal K1, if signal $B_i$ is high (indicating flip-flop $B_i$ is in its "1" state) a $SB_{i-1}$ pulse is produced which sets flip-flop $B_{i-1}$ to its "1" state while conversely if signal $B_i'$ is high (indicating flip-flop $B_i$ is in its "0" state) a $ZB_{i-1}$ pulse will be produced to thereby place flip-flop $B_{i-1}$ in its "0" state.

The resultant delayed output signals $B_{i-1}$ and $B_{i-1}'$ produced by flip-flop $B_{i-1}$ are applied, as shown in Fig. 2, as inputs to signal combining circuit 18 which for the embodiment shown in Fig. 2, functions to combine signals ($B_i$ and $B_{i-1}$ (and also the complementary signals $B_i'$ and $B_{i-1}'$) to produce a resultant train of difunction signals $S_i$ which has a high level representing the difunction quantity $N_1$ when signals $B_i$ and $B_{i-1}$ have the same value (indicating two alternations within a period) and has a low "0" level representing the difunction quantity $N_2$ when signals $B_i$ and $B_{i-1}$ have different values (indicating one alternation within the period). The required relationship between output signals $S_i$ and the input signals is described by the following truth table, Table I wherein all possible combinations of values of signals $B_i$ and $B_{i-1}$ are listed together with the resultant values of signal $S_i$.

*Table I*

| $B_i$ | $B_{i-1}$ | $S_i$ |
|---|---|---|
| 1 | 1 | 1($N_1$) |
| 1 | 0 | 0($N_2$) |
| 0 | 1 | 0($N_2$) |
| 0 | 0 | 1($N_1$) |

As indicated by Table I, each signal $S_i$ is to have a high level whenever and only when signal $B_i$ is at a 1 level and Signal $B_{i-1}$ is at a 1 level or signal $B_i$ is at a 0 level ($B'=1$) and signal $B_{i-1}$ is at a 0 level ($B_{i-1}'=1$). Expressing this relationship as a corresponding logical gating equation, it can be written that:

$$S_i=B_iB_{i-1}+B_i'B_{i-1}' \quad (1)$$

where the (+) indicates that the logical "or" operation is to be performed upon the signals joined thereby and the absence of an (+) indicates that the logical "and" operation is to be performed upon the signals joined thereby. In accordance with Equation 1 to form the required signal $S_i$ the signals $B_i$ and $B_{i-1}$ are combined in a logical "and" gate ("and" gate 25 as shown in circuit 18 of Fig. 2) to form an output signal $B_iB_{i-1}$ which is high only when signals $B_i$ and $B_{i-1}$ are both high while signals $B_i'$ and $B_{i-1}'$ are combined by a second logical "and" gate ("and" gate 26) to form the output signal $B_i'B_{i-1}'$. The signals $B_iB_{i-1}$ and $B_i'B_{i-1}'$ are then combined by an "or" gate ("or" gate 27) to produce the required output signal $S_i=B_iB_{i-1}+B_i'B_{i-1}'$, this signal being high only when signals $B_i$ and $B_{i-1}$ have the same values.

To illustrate the operation of that embodiment of converter 14 which is shown in Fig. 2 there has been provided in Fig. 3*a* a waveform chart wherein there are plotted on a common time scale waveforms of signals K1, $B_i$, $B_{i-1}$ and $S_i$ as they would appear in response to the application of an input signal A having a frequency of alternation 1⅓ times greater than the frequency $$f_2=\frac{1}{T}$$

of the timing signal K1. As explained in the aforementioned copending U.S. application Ser. No. 588,078 if it is assumed that the difunction value $N_1=+1$ and the difunction value of $N_2=-1$, then the value of the train of difunction signals $S_i$ should be equal to the quantity $$2\frac{f_1}{f_2}-3$$

and therefore equal to $$2\left(\frac{4}{3}\right)-3$$

or $$-\frac{1}{3}$$

In the difunction system in which $N_1=+1$ and $N_2=-1$, the quantity $$-\frac{1}{3}$$

would be represented by a signal train which comprises one high +1 representing signal for every two low −1 representing signals so that the average of the values of the signals is $$\frac{(1)+(-2)}{3} \text{ or } -\frac{1}{3}$$

It is seen from a consideration of Fig. 3*a* that signals $S_i$ have exactly this form, and the following explanation will describe how the difunction signals $S_i$ are obtained from signal A in accordance with the operations hereinbefore described.

Consider first what occurs when a timing signal K1 appears at the beginning of period 1 (successive periods T of the timing signal are designated 1, 2, 3 etc.). At this time signal A is at a high level and therefore the corresponding signal $B_1$ of signal train $B_i$ is produced having a high 1 level. At the beginning of period 2 signal A has a low level so that signal $B_2$ is formed having a low 0 level. At the beginning of period 3, the level of signal A is neither definitely high nor definitely low but is in a transitional or ambiguous region. However, since flip-flop $B_i$ is a bistable device which must perforce be in one or the other of its states, signal $B_3$ must be at either a definite high or low level. It is assumed in connection with Fig. 3*a* that signal $B_3$ which is produced in response to the ambiguous input has a high 1 level and that a similar response is made to each of the other ambiguous inputs (at the beginning of periods 3, 6, 9 as designated by the asterisks *). In accordance with this assumption signal train $B_i$ will thereafter be comprised, as shown, of repeating patterns of two high signals and one low signal. Signal train $B_{i-1}$ will, of course, display the same pattern but with each signal therein delayed by one period so that, for example, signal $B_1$ appears in the delayed signal train $B_{i-1}$ at the same time that signal $B_2$ appears in signal train $B_i$. To obtain signal train $S_i$ each signal of signal train $B_i$ is, as explained, combined with the corresponding signal of signal train $B_{i-1}$ to form a high +1 representing signal if $B_i$ and $B_{i-1}$ have the same values and a low −1 representing level if $B_i$ and $B_{i-1}$ have different values. Following these rules, it is seen that signal train $S_i$ will be comprised of a pattern of two low −1 representing signals and one high +1 representing signal, this pattern repeating every three periods (designated as a repetition interval). In this manner through operation in accordance with the rules regarding the joint significance of signals $B_i$ and $B_{i-1}$, the signal train $S_i$ having a difunction value of $$-\frac{1}{3}(\text{in an } N_1=+1 \text{ and } N_2=-1 \text{ system})$$

is produced by that embodiment of signal combining circuit 18 shown in Fig. 2.

Although in connection with Fig. 3*a*, it has been assumed that a high level signal $B_1$ was produced by signal generator 15 in response to each ambiguous input, it can be shown that with the described mode of operation in which significance of signals is found by examination of pairs of successive signals, it is immaterial whether a high or low level signal $B_1$ is produced in response to an ambiguous input. This independence with respect to ambiguous inputs is very well illustrated by the waveforms shown in Fig. 3*b*, in which it has been assumed that in signal train $B_i$ in response to the first ambiguous input (at the beginning of period 3 as marked by the asterisk) a high signal $B_i$ was produced which in response to the next two ambiguous inputs (at the beginning of periods 6 and 9) low level signals are produced. All of the other signals of signal train $B_i$ are, as before, high or low in accordance with the non-ambiguous high or low levels of signal A. The train of signals $B_{i-1}$ is formed as before by delaying each signal of signal train $B_i$ for one period and, as before, each signal $B_i$ is combined with the corresponding $B_{i-1}$ signal to form an $S_i$ signal. Considering the resultant train of signals $S_i$ shown in Fig. 3*b*, it is seen that although the pattern has been slightly changed from that shown in Fig. 3*a*, it nevertheless includes two −1 signals and one +1 signal in each repetition interval so that its average value is still a $$-\frac{1}{3}$$

even though entirely different responses have been made by generator 15 to ambiguous inputs.

Essentially this independence of the system to ambiguous inputs has been obtained by restricting the frequency range of input signals enough so that each ambiguous input must necessarily be "bracketed" (followed and preceded) by non-ambiguous inputs. Since each result of an ambiguous input is used twice, once paired with the preceding signal and once paired with the succeeding signal, it will have the effect of increasing the value of one signal pair and decreasing the value of the next signal pair, thereby causing a cancellation of any error in the resultant difunction signal train.

For example, in the particular situation which has been illustrated in Figs. 3*a* and 3*b*, the frequency $f_1$ of alternation of the variable frequency input signal A is so restricted and the frequency $f_2$ of the timing signal K1 is so selected that if any timing signal K1 appears when signal A is ambiguous, the immediately preceding timing signal and the immediately following timing signal will each appear when input signal A is non-ambiguous. Moreover considering these preceding and following timing signals, it is clear that one of these two timing signals must appear when signal A is low, while the other of the two timing signals must appear when signal A is high. Thus each ambiguous input is necessarily bracketed by non-ambiguous inputs of opposite levels and significance. Since as described hereinbefore, the ambiguous input is used twice, paired first with the preceding input and paired secondly with the following (and oppositely valued) input signal, it is clear that the effect of the central ambiguous input will be cancelled.

For example consider the input signal sequence:

1, ambiguous, 0

If the central ambiguous input is considered to have the value 1, then the difunction value of the first pair of signals (1, 1) would be $N_2$ and the difunction value of the second pair of signals (1, 0) would be $N_1$. On the other hand, if the central ambiguous input is considered to have a 0 value, then the same two difunction values would be formed although in the reverse order $N_1$, $N_2$. Similar results are obtained with the input signal sequence 0, ambiguous, 1, as has been hereinbefore demonstrated in Figs. 3*a* and 3*b*.

As illustrated in Figs. 3*a* and 3*b* and as hereinbefore mentioned, since only one or two alternations of input signal A are to occur in a period T of the timing signal K1, the relationship between the frequencies $f_1$ (of input signal A) and $f_2$ (of timing signal K1) is that $1f_2<f_1<2f_2$ . . . or restating this relationship in terms of the periods of the input and timing signals, that $1t^{max}<T<2t^{min}$ (where T is the period of the timing signal K1 as stated, and $t^{max}$ and $t^{min}$ are defined as the minimum and maximum periods of alternation of the input signal A). This same described relationship is, it is clear, effective to cause timing signals bracketing an ambiguous input to themselves avoid ambiguous inputs, the period T of timing signal K1 being for example slightly greater than $1t^{max}$ by the duration of an ambiguous input, and being similarly less than $2t^{min}$ as is shown in Figs. 3*a* and 3*b*.

In the more general description, in which $n$ or $n+1$ alternations of the input are to occur, the corresponding frequency relationship which may be utilized is, as hereinbefore described, that $nf_2<f_1<(n+1)f_2$ . . . or restated in terms of periods that $nt^{max}<T<(n+1)t^{min}$. The period T of the timing signal need only slightly exceed $nt^{max}$ by the duration of an ambiguous input and may be similarly less than $nt^{min}$. It is clear that since frequency range of the input signal is known to be bounded, the timing signal K1 may always be generated at a selected frequency which will correspond to the desired frequency relationship.

It will be recalled that, as has been explained before, since a difunction value is inherently represented by each pair of signals $B_i$ and $B_{i-1}$, it is not necessary that these signals be separately combined before proceeding with further mathematical operations, but that insead they may be directly utilized in combination with other input signals to produce a resultant difunction signal. For example, in Fig. 4 there is shown one embodiment of signal combining circuit 18 wherein the trains of signals $B_i$ and $B_{i-1}$ representing one quantity are directly combined with a train of difunction signals $D_i$ representing a second quantity to form a train of difunction signals $S_i$ representing the sum of two quantities.

Table 2 provided hereinbelow illustrates the rules which govern such an addition, provided the difunction values are chosen as +1 and −1.

*Table 2*

| Difunction Value of $B_i$ and $B_{i-1}$ | Difunction Value of $D_i$ | Difunction Value of $S_i$ |
|---|---|---|
| +1 | +1 | +1 |
| −1 | −1 | −1 |
| +1 | −1 | 0 [1] |
| −1 | +1 | 0 [1] |

[1] Represented by alternate +1's and −1's.

As indicated by Table 2, two difunction values are summed by adding them and dividing by two, so that the result is expressible in terms of +1's and −1's. Thus the sum of two +1's is +1 (rather than +2), the sum of two −1's is −1 and the sum of a +1 and −1 is 0. However, since only +1's and −1's are to appear in the output, successive 0 results are represented by alternate +1's and −1's.

This process is very well illustrated by the waveforms of signals $B_i$, $B_{i-1}$, $D_i$ and $S_i$ which are shown in Fig. 3*c* to clarify the operation of that embodiment of circuit 18 which is shown in Fig. 4. It is seen that signals $B_i$ and $B_{i-1}$ are identical to those shown in Fig. 3*a* except that they have been extended for another two periods. It will be recalled that these two trains of signals represent the quantity $$-\frac{1}{3}$$

The train of difunction signals $D_i$ is made up of recurring patterns of five +1's and one −1 and therefore represents the quantity $$\frac{5-1}{6} \text{ or } +\frac{2}{3}$$

The difunction sum of these two quantities is their true algebraic sum divided by two, equal in this instance to $$\frac{-\frac{1}{3}+\frac{2}{3}}{2} \text{ or } +\frac{1}{6}$$

Thus the difunction signal train $S_i$ shown in Fig. 3*c* should have a value of $$+\frac{1}{6}$$

(expressed by seven +1's and five −1's appearing in each group of 12 signals (as shown in Fig. 3*c*).

Considering now the formation of the successive signals $S_i$ in period 2, signals $B_i$ and $B_{i-1}$ have different values representing a −1 while signal $D_i$ represents a +1, the difunction sum of these values being a 0. In period 3, $B_i$ and $B_{i-1}$ are again different representing a −1, and $D_i$ again represents a +1, so that a second 0 sum is produced. As shown in Fig. 3*c* these successive 0 sum values in periods 2 and 3 are represented by corresponding alternate +1 and −1 signals in signal train $S_i$. In a similar manner 0 sums are produced in periods 5, 6, 7, 8, 9, 11, 12 and 13 and are generated as alternate +1 and −1 signals. In periods 4 and 10, $B_i$ and $B_{i-1}$ have the same values representing a +1 and signal $D_i$ has a +1 value, so that two +1 sum signals are produced. In accordance with these rules in twelve periods of difunction signal train $S_i$ there are produced seven +1 signals and five −1 signals, the signal train therefore having the required value of $$\frac{7-5}{12} \text{ or } +\frac{1}{6}$$

In mechanizing these summing operations, as shown in Fig. 4, logical diode gating circuits and a flip-flop circuit are utilized. The purpose of the flip-flop circuit, such as flip-flop K, is to provide a convenient means of insuring that alternate +1 and −1 signals are produced for successive 0 sum values. In each period that a 0 sum is detected by the logical gating circuits, one of the outputs (arbitrarily selected as the K output) of flip-flop K is read as an output signal and at the end of the period, flip-flop K is triggered or reversed in state so that an alternate output signal will be produced on the next 0 sum. Triggering of flip-flop K is accomplished by applying simultaneous SK and ZK input signals to the two input terminals (S and Z) of flip-flop K, each period that a 0 sum is detected by the logical gating circuits. It is clear, in view of the foregoing therefore, that flip-flop K must be triggered by a timing signal K1 whenever $B_i$ and $B_{i-1}$ are different and $D_i$ is a +1 or when $B_i$ and $B_{i-1}$ are the same and $D_i$ is a −1. Expressing this condition in terms of the corresponding logical equations, signals SK and ZK can be written as:

$$SK=ZK=K1[D_i(B_i'B_{i-1}+B_iB_{i-1}')+D_i'(B_iB_{i-1}+B_i'B_{i-1}')] \quad (2)$$

The values of output signals $S_i$ can be similarly expressed by a logical equation relating the output signal to the input signal and to the signal K produced by flip-flop K. In accordance with the preceding discussion, it is clear that each output signal $S_i$ equals +1 whenever (and only when) $B_i$ and $B_{i-1}$ are the same and $D_i$ is a +1 or there is a 0 sum and K is a +1. Expressing this by a corresponding logical equation:

$$S_i=D_i(B_iB_{i-1}+B_i'B_{i-1}')+K[D_i(B_i'B_{i-1}+B_iB_{i-1}')+D_i'(B_iB_{i-1}+B_i'B_{i-1}')] \quad (3)$$

As is clear from a consideration of Fig. 4, the embodiment of signal combining circuit shown in Fig. 4 is mechanized in exact accordance with the terms of logical Equations 2 and 3.

One outstanding advantage hereinbefore explained of the frequency-to-difunction converter of the present invention is that operating elements do not require any synchronously operating elements to receive the input signal A. Instead all elements of converter 14 operate synchronously with reference to the timing signal K1. Because of this type of operation, each element of converter 14 may be time shared for the conversion of a number of input signals to corresponding difunction signal trains. Great reductions in the number of components required can be obtained with such a mode of operation.

One form of such a time shared frequency-to-difunction converter is shown in Fig. 5 which is adapted for receiving six variable frequency input signals $A^1$, $A^2$, $A^3$, $A^4$, $A^5$ and $A^6$, and for converting each of these signals to corresponding difunction signal trains $S^1$, $S^2$, $S^3$, $S^4$, $S^5$ and $S^6$ respectively. In the embodiment shown in Fig. 5 the delay element 17 is mechanized by means of a rapidly rotating drum 50 having magnetizable tracks 51, 52, 53, 54 and 55 established thereon on which signals may be recorded and played back.

As indicated in Fig. 5, any signals transferred to a flip-flop M are recorded on track 52 by means of an intervening recording or "write" circuit 58 and a magnetic recording head 59 as corresponding magnetic signals. Because of the continuous rotation of drum 50 each signal so recorded is transported around the drum to pass, after the period T, beneath a succeeding magnetic playback head 60 which detects the signals and in response thereto actuates a read circuit 62 which in turn sets or zeros a flip-flop L in accordance with the value of the played-back signal. In this manner each signal transferred to flip-flop M reappears after a period T in flip-flop L, and therefore the whole assemblage of flip-flop M, write circuit 58, head 59, the moving track 52, head 60, read circuit 62 and flip-flop L may be viewed as another embodiment of delay element 17. A permanent magnet erase head 64 is provided, preceding head 59, to insure that track 52 is cleared (in a uniform state to receive signals) before it passes beneath record head 59.

Synchronizing or clock signals are continuously recorded about the drum on track 51, these clock signals being read by a playback head 67 which applied the signals to a conventional clock pulse generating circuit 68, which functions to generate a sharp electrical pulse signal *Cl* each time one of the recorded synchronizing signals passes beneath head 67. In the embodiment shown, 180 clock signals are recorded around the periphery of the drum effectively marking off the drum periphery into 180 clock signals are recorded around the periphery of sidered to comprise 180 cells in which bivalued signals may be recorded. In operation recording and playback of signals on drum 50 is synchronized by the pulses *Cl* so that signals are recorded and played back in their appropriate cells without overlap.

In the present converter there are 18 cells between read head 59 and playback head 60. Thus it is clear that the delay period T (the time required for a signal to pass from head 59 to head 60) corresponds to the time required for 18 cells to pass beneath a playback head. Because of this fact, a very simple method is available for generating the timing signals K1: Namely to have the timing signals recorded on a separate track at intervals of 18 cells all the way around the drum. In the present machine substantially this scheme is utilized, although for purposes which will appear later, the occurrence of a timing signal is not represented by the appearance of a single signal on a single track, but by the simultaneous passage of three predetermined signals (on tracks 53, 54 and 55 respectively) as they pass beneath a corresponding set of playback heads 73, 74 and 75, these signals having a predetermined significance in a binary code. As shown in Fig. 5 the heads 73, 74 and 75 are coupled through corresponding "write" circuits to flip-flops P, Q and R respectively, the states of these flip-flops thereby always indicating the values of the signals passing beneath their associated playback heads.

As an illustration of this process, it can be said at this time that the appearance of signals in P, Q and R representing the number 1 in binary code (001 or a 0 in P, a 0 in Q, and a 1 in R) has the effect of ordering the sampling of the level of input signal $A^1$, and the transferring of a corresponding 1 or 0 signal to a flip-flop B. Similarly the appearance in flip-flops P, Q and R of signals representing the numbers 2, 3, 4, 5 and 6 in binary code have the effect of ordering the sampling of signals $A^2$ through $A^6$ in similar manner. It can be considered that the tracks 53, 54 and 55 are divided into ten identical sectors each of 18 cells. In each sector the code signals appearing in flip-flops P, Q and R are able to order the successive sampling of all of the six input signals, the recording of these signals (for purpose of providing the delay T), the comparison of each of these six sampled signals (as they appear in flip-flop B) with the six corresponding signals recorded during the passage of the preceding sector, and the generation of the corresponding six difunction signals.

All of the operations set forth above are conducted by means of logical gating circuit 80 which, as shown in Fig. 5, receives the output signals of flip-flops P, Q and R (thereby receiving the code instructions), the clock pulses C1, the output signals of flip-flop L and the input signals $A^1$ through $A^6$ and in response thereto produces ten output signals, the signals SM and ZM, SB and ZB and the difunction signals $S_i^1$ through $S_i^6$. Gating circuit 80 therefore comprises ten logical gating networks, each network producing one of the ten output signals. Circuit diagrams of these ten networks are shown in Figs. 6*a* through 6*j*. It is felt, however, that the clearest and most satisfactory manner of explaining the structure and operation of these gating networks is to first develop the corresponding logical equations for these ten output signals. As explained hereinbefore each logical gating circuit exactly defines the structure of the corresponding gating network, there being a one-to-one correspondence between the term of the logical gating equations and the "and" and "or" gates utilized in the gating network.

As a first step in developing the logical equations we will consider the operations of flip-flops L, B, P, Q, and R during passage of one of the ten sectors. The successive contents of these flip-flops during passage of the 18 cells of the sector (as demarked by the clock signal C1) are illustrated on a common time scale in Fig. 7. Considering first the successive contents of flip-flops P, Q and R it will be remembered that these flip-flops are merely reading the successive binary code signals which are recorded in the cells of tracks 53, 54 and 55 respectively.

As indicated in Fig. 7 in these tracks binary "1's" are recorded in the first cells of the sector so that upon passage of these first cells of the sector "1" signals appear in flip-flops P, Q and R, thus representing the binary code 111 whose decimal equivalent is the number 7. In the second cells of the sector "0's" are recorded, so that during the passage of the second cells "0" signals appear in flip-flops P, Q and R, thus representing the binary code 000 whose decimal equivalent is the number 0. Similarly, during passage of the third cells, the binary code (010) for the number 2 appears in flip-flops P, Q and R. The remaining codes appearing in flip-flops P, Q and R are clearly indicated in Fig. 7 together with the decimal equivalents thereof. It is seen that the 18 codes appearing are in order 7, 0, 2, 7, 0, 3, 7, 0, 4, 7, 0, 5, 7, 0, 6, 7, 0, 1—this code sequence then beginning again as the first cell of the next sector appears.

Each of these codes as it appears has the effect of ordering a corresponding operation to be performed by the circuits of the converter when a C1 pulse appears and of transferring the result of the operation to flip-flop B. The successive codes thus serve as successive instructions, the significance of these instructions being summarized in following table, Table 3.

*Table 3*

| Binary Code (contents of flip-flops) | | | Decimal Equivalent | Instructions |
|---|---|---|---|---|
| P | Q | R | | |
| 0 | 0 | 0 | 0 | Zero flip-flop B. |
| 0 | 0 | 1 | 1 | Sample $A^1$ and transfer result to flip-flop B. |
| 0 | 1 | 0 | 2 | Sample $A^2$ and transfer result to flip-flop B. |
| 0 | 1 | 1 | 3 | Sample $A^3$ and transfer result to flip-flop B. |
| 1 | 0 | 0 | 4 | Sample $A^4$ and transfer result, to flip-flop B. |
| 1 | 0 | 1 | 5 | Sample $A^5$ and transfer result to flip-flop B. |
| 1 | 1 | 0 | 6 | Sample $A^6$ and transfer result to flip-flop B. |
| 1 | 1 | 1 | 7 | Form difunction in flip-flop B. |

The successive contents of flip-flop B are determined in accordance with these instructions. The contents of flip-flop B are then transferred to flip-flop M on each C1 pulse. Probably the best way to illustrate this mode of operation is to consider initially what occurs during passage of the last or 18th cell of the preceding period. At this time the code 001 (1 in decimal) appears in flip-flop P, Q and R. Therefore, in accordance with the corresponding instruction shown in Table 3, at the end of the cell (when a clock pulse C1 appears), input signal $A^1$ is sampled and a corresponding signal $B_i^1$ is placed in flip-flop B (signal $B_i^1$ being 1 or 0 in accordance with the value of signal $A^1$ at the time of sampling).

Therefore, during passage of the first cell of the present sector, flip-flop B holds signal $B_i^1$. At the same time, the preceding signal $B_{i-1}^1$ is appearing (at the output of the delay element) in flip-flop L. Since both signals $B_i^1$ and $B_{i-1}^1$ are simultaneously available, this is the appropriate time to form the corresponding difunction signal $S_i^1$ represented thereby and to record the present $B_i^1$ in the delay element (by transferring it to flip-flop M). In this manner, the present $B_i^1$ will be available during the next sector as delayed signal $B_{i-1}^1$. The code (111 or 7) which now appears, during passage of the first cell, orders the performance of exactly these operations, difunction signal $S_i^1$ being placed in flip-flop B and present signal $B_i^1$ being transferred to flip-flop M.

At the end of the next or second cell (in accordance with the code instruction 000 or decimal 0) signal $S_i^1$ in flip-flop B is transferred to flip-flop M for reasons which will appear, and flip-flop B is zeroed. In this manner, flip-flop B is placed in a known state, thereby simplifying the gating associated with sampling the next signal $A^2$.

At the end of the passage of cell 3 (in accordance with the code 010 or decimal 2) the 0 in flip-flop B is transferred to flip-flop M and then signal $A^2$ is sampled in the same manner that signal $A^1$ was previously sampled, the resultant signal $B_i^2$ being placed in flip-flop B. In this manner signal $B_i^2$ will be available in flip-flop B at the same time (during passage of cell 4) that the preceding signal $B_{i-1}^2$ appears at the output of the delay element in flip-flop L. The corresponding difunction signal $S_i^2$ is next formed (at the end of cell 4) and is placed in flip-flop B.

It is readily seen that all of the operations connected with signal $A^1$ are now being repeated for signal $A^2$ and will thereafter be repeated in turn for signals $A^3$ through $A^6$. Thus at the completion of the sector a difunction signal, signals $S_i^1$ through $S_i^6$, will have been formed for the variable frequency input signals $A^1$ through $A^6$ respectively. Each of the input signals will have been sampled to form synchronous signals $B_i^1$ through $B_i^6$ respectively, which will be recorded on the drum so as to be available during passage of the next sector as the delayed signals $B_{i-1}^1$ through $B_{i-1}^6$, respectively.

The difunction values $S_i^1$ through $S_i^6$ are read out externally at the time that they are in flip-flop M, this being a suitable time to identify them so that they can be read out on separate conductors to form six separate difunction signal trains. For example, it is clear from Fig. 7 that at the time that $S_i^1$ appears in flip-flop M, the code 010 or 2 appears in flip-flops P, Q and R, thereby uniquely identifying $S_i^1$. Similarly signals $S_i^2$ through $S_i^6$ in flip-flop M are uniquely identified by the simultaneous appearance of codes 3 through 6 and 1 in flip-flops P, Q and R, respectively. From this, the logical equations defining signals $S_i^1$ through $S_i^6$ may immediately be written as:

$$S_i^1 = 2M \quad (4a)$$
$$= P'QR'M \quad (4b)$$
$$S_i^2 = 3M \quad (5a)$$
$$= P'QRM \quad (5b)$$
$$S_i^3 = 4M \quad (6a)$$
$$= PQ'R'M \quad (6b)$$
$$S_i^4 = 5M \quad (7a)$$
$$= PQ'RM \quad (7b)$$
$$S_i^5 = 6M \quad (8a)$$
$$= PQR'M \quad (8b)$$
$$S_i^6 = 1M \quad (9a)$$
$$= P'Q'RM \quad (9b)$$

Equations *4a* through *9a* are written for purposes of illustration in terms of the decimal designations of the codes appearing in flip-flops P, Q and R, while in Equations *4b* through *9b* the same signals are defined in conventional manner in terms of the signals produced by P, Q, R and M, these being the signals which are combined to form the output signals.

Considering now the logical equations for the signals SM and ZM, from a consideration of Fig. 7, it has been stated that flip-flop B always transfers to flip-flop M at the end of each cell (at the time that the clock signal C1 appears). Thus the equations for SM and ZM may be immediately written as:

$$SM=BC1 \qquad (10b)$$
$$ZM=B'C1 \qquad (11b)$$

The logical equations for SB and ZB are also quite simple. It will be recalled that in response to the codes 1, 2, 3, 4, 5 and 6 flip-flop B will be set if signals $A^1$ through $A^6$, respectively, are high. Moreover in response to the code of 7 the difunction value is to be formed in B and therefore B will be set if L and B are the same. Thus the equation for SB may be written as:

$$SB=C1[1A^1+2A^2+3A^3+4A^4+5A^5+6A^6+7(LB+L'B')] \qquad (12a)$$

Similarly in connection with the signal ZB it will be remembered that flip-flop B is to be zeroed in response to the code of 0 and moreover will be zeroed in response to the code of 7 (when the difunction is to be formed in B) if L and B are different. Since flip-flop B is zeroed at each 0 code, there is no need to zero the flip-flop when one of the A signals is zero. Thus the equation for 2B may be written as:

$$ZB=C1[0+7(LB'+L'B)] \qquad (13a)$$

Equations 12*a* and 13*a* are rewritten below in more conventional form in which the code designations are replaced by the corresponding output signals of P, Q and R, and also certain obviously redundant terms have been dropped from the expressions involving L and B. The resultant equations for SB and ZB are:

$$SB=C1[P'Q'RA'+P'QR'A^2+P'QRA^3+PQ'R'A^4+PQ'RA^5+PQR'A^6+PQRL'] \qquad (12b)$$
$$ZB=C1[P'Q'R'+PQRL'] \qquad (13b)$$

At this point all of the logical Equations 4*b* through 13*b* which define the output signals produced by the ten gating networks of gating circuit 80, have been developed from a consideration of the relationship of these signals to the operations of the converter. It is clear, referring to the drawing that the logical gating networks shown in Figs. 6*a* through 6*j* are mechanized with diode "and" and "or" gates in exact accordance with the terms of the corresponding logical Equations 4*b* through 13*b*, respectively.

Having completed description of the structure and operation of the embodiment of converter 14 shown in Fig. 5, only a brief comment is given on the input signals $A^1$ through $A^6$ which the converter operates upon. As in Fig. 3, the input signal $A^1$ may be, as shown in Fig. 5, a variable frequency square wave such as might be produced by a free running variable frequency astable multivibrator or by a clipping and squaring circuit operating upon a sine wave produced by a variable frequency oscillator. However, it should be understood that the converter of the present invention does not necessarily require precise squared-up waveforms of this type. All that is really required of an input signal is that it comprise alternate high (above a predetermined threshold) and low (below a predetermined threshold) voltage levels. Thus the input signal may simply be an ordinary sine wave derived directly from a variable frequency oscillator, as is illustrated for example in Fig. 5 in connection with signal $A^2$.

What is claimed as new is:

1. A frequency-to-difunction conversion apparatus for converting an applied asynchronous variable frequency input signal having alternate high and low voltage levels into a train of bivalued signals synchronized with respect to applied timing signals of predetermined period T and representing the frequency of alternations of said input signal, said apparatus comprising: a synchronous signal generator responsive to each timing signal for sampling the asynchronous variable frequency input signal and selectively producing a first or second valued resultant signal respectively when the input signal is definitely high or definitely low at the instant of sampling and for randomly producing either a first or second valued resultant signal when the input signal is at an ambiguous neither definitely high nor definitely low level at the instant of sampling; a delay element for delaying each resultant signal to present a delayed resultant signal simultaneously with the production of the succeeding resultant signal by said signal generator whereby, each pair of simultaneously presented delayed and succeeding resultant signals represents a first difunction value if the signals of the pair are equivalued and represents a second difunction number if the signals of the pair are differently valued, the average value of the numbers represented by successive signal pairs being proportional to the frequency of the input signal.

2. The frequency-to-difunction conversion apparatus defined by claim 1 which further includes a signal combining circuit coupled to said synchronous signal generator and to said delay element for combining each successive pair of simultaneously presented delayed and succeeding resultant signals to produce a difunction signal train representative of the frequency of the input signal.

3. The frequency-to-difunction conversion apparatus defined by claim 1 which further includes a signal combining circuit for combining each delayed resultant signal and simultaneously presented succeeding resultant signal to produce an output difunction signal having one predetermined value if the delayed and succeeding signals have like values and another predetermined value if the delayed and succeeding signals have different values, the average value of the difunction signals being proportional to the frequency of the input signal.

4. The frequency-to-difunction conversion apparatus defined in claim 1 which further includes a signal combining circuit coupled to said delay element and to said signal generator and operable for combining each pair of simultaneously presented delayed and succeeding signals with a simultaneously presented signal of an applied signal train representative of a quantity to produce an output difunction signal train representative of a mathematical function of the frequency of the input signal and the quantity represented by the applied signal train.

5. The frequency-to-difunction conversion apparatus defined by claim 1 wherein said signal combining circuit is operable for combining each pair of simultaneously presented delayed and succeeding signals with a simultaneously presented signal of an applied signal train representing a quantity to produce an output difunction signal train representative of the sum of the quantity and the frequency of the input signal.

6. A frequency-to-difunction conversion apparatus for converting an applied asynchronous variable frequency input signal having alternate high and low voltage levels into a train of bivalued signals synchronized with respect to applied timing signals of predetermined period T each bilevel signal and the preceding signal representing either a first or second difunction value and the average of said difunction values being proportional to the frequency of said input signal, said apparatus comprising: first means responsive to each timing signal for sampling the asynchronous variable frequency input signal and producing a resultant control signal; second means responsive to each control signal for producing a first-valued output signal when the input signal has a definitely high level at the instant of sampling and a second-valued signal when the input signal is definitely low at the instant of sampling, said second means randomly producing either a first or second-valued output signal when the input signal is at an ambiguous neither definitely high nor definitely low level at the instant of sampling, whereby each output signal produced and the preceding output signal represents a first number if the output signal and the preceding output signal have the same values and represent a second number if the output signal and the preceding output signal have different values, the average value of the numbers represented by said output signals being directly proportional to the frequency of the applied variable frequency input signal.

7. The frequency-to-difunction conversion apparatus defined by claim 6 which further includes a delay element for delaying each output signal for the period T to present the delayed output signal simultaneously with the production of the next output signal by said second means, and means coupled to said delay element and to said second means for combining each pair of simultaneously presented output signals to produce a corresponding difunction signal.

8. An input conversion apparatus for converting a variable frequency asynchronous input signal having alternate high and low voltage levels to a difunction signal train representing the frequency of said input signal and synchronized with respect to an applied timing signal having a predetermined period T, said apparatus comprising: synchronous signal generating means receiving said asynchronous input signal and responsive to the application of each timing signal for producing a bivalued signal representing the level of said asynchronous input signal at the time of application of said timing signal; signal storage means for storing each of said bivalued signals; means coupled to said signal generating means and to said signal storage means for combining each of said bivalued signals with the bivalued signal stored in the preceding period T to produce a bivalued output signal having a first value representing a predetermined number $N_1$ when the two bivalued signals have the same value and having a second value representing a predetermined number $N_2$ when the two bivalued signals have different levels, the average value of the numbers represented by said output signals being proportional to the frequency of said input signals whereby the successive output signals comprise the difunction signal train.

9. A frequency-to-difunction converter for producing a train of bilevel signals non-numerically representing the frequency of an asynchronous input signal having alternate high and low voltage levels, each successive signal of the signal train being formed in corresponding successively adjacent timing intervals, said converter comprising: a signal storage device, a synchronous signal generator responsive to the asynchronous input signal for producing at the end of each timing interval a first bilevel signal representing the level of said input signal and recording said bilevel signal in a signal storage device; means for concurrently reading from the signal storage device, a second bilevel signal recorded in the previous timing interval; and means responsive to the first and second signals for selectively producing either a first output signal representing a predetermined number $N_1$ if the first and second bilevel signals have the same voltage levels or a second output signal representing a predetermined number $N_2$ if the first and second bilevel signals have different voltage levels.

10. A frequency-to-difunction converter for converting an applied asynchronous variable frequency input signal having alternate high and low voltage levels to a difunction signal train representative of the frequency of the input signal, said converter comprising: means for successively sampling the asynchronous variable frequency input signal at successive periods T and generating in each period T a bivalued signal $B_i$ (where $i$ has the values 1, 2, 3 . . . etc. in successive periods) representing the level of the input signal at the time of sampling; a signal combining means operable for combining two applied bivalued signals to produce a corresponding difunction signal; and second means intercoupling said first means and said signal combining means for receiving each signal $B_i$ and simultaneously applying the signal $B_i$ and the preceding signal $B_{i-1}$ to said signal combining means.

11. A frequency-to-difunction converter for receiving a plurality of variable frequency asynchronous input signals $A^1, A^2 \ldots A^n$ (where $n$ is a predetermined integer) each having alternate high and low voltage levels to produce a corresponding plurality of trains of difunction signals, each train being representative of the frequency of the corresponding input signal and the difunction signals thereof being synchronized with respect to applied timing signals of predetermined period T, said converter comprising: a synchronous signal generator responsive to the timing signals for successively sampling each of the asynchronous input signals $A^1 \ldots A^n$ during each period T and producing a corresponding plurality of bilevel signals $B_i^1 \ldots B_i^n$ (where $i$ has the values 1, 2, 3 . . . etc. in successive periods T), each signal $B_i$ having either a high or low level representing the level of the corresponding input signal at the instant of sampling; a delay element for successively receiving each bilevel signal and delaying each signal for a period T to present a corresponding delayed signal $B_{i-1}$ simultaneously with the production of the corresponding signal $B_i$ by said synchronous signal generator; and signal combining means responsive to each pair of corresponding simultaneously presented bilevel signals $B_i$ and $B_{i-1}$ to produce a corresponding difunction signal $D_i$, the successive signals $D_i$ comprising a difunction signal train representative of the frequency of the corresponding input signal.

12. The converter defined by claim 11 wherein said synchronous signal generator includes a bistable electronic storage circuit having two states of operation and gating means responsive to the timing signals for successively sampling each of the input signals $A_1 \ldots A_n$ and setting said bistable storage circuit to successive states corresponding respectively to the high or low level of the successively sampled input signals $A_1 \ldots A_n$ at the instants of sampling, said bistable storage circuit producing output signals representing its state of operation, the successive output signals produced by said storage circuit comprising said bilevel signals $B_i^1 \ldots B_i^n$.

13. The converter defined by claim 11 which includes a rotatable magnetic drum and means coupled to said drum and responsive to the rotation thereof to produce said timing signals, said drum having a memory track established thereon, said delay element including write means for recording each signal $B_i$ in said memory track and read means for reading each recorded signal from said memory track to present each recorded signal at a predetermined read point after said period T.

14. The converter defined by claim 12 wherein said signal combining means includes apparatus for recording each signal $D_i$ in said memory track.

References Cited in the file of this patent

UNITED STATES PATENTS

| | | |
|---|---|---|
| 2,755,459 | Carbrey | July 17, 1956 |
| 2,758,788 | Yaeger | Aug. 14, 1956 |